(12) United States Patent
Davis

(10) Patent No.: US 10,442,015 B2
(45) Date of Patent: Oct. 15, 2019

(54) CUTTING TOOL

(71) Applicant: The Boeing Company, Chicago, IL (US)

(72) Inventor: Robert P. Davis, Vancouver, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 15/944,940

(22) Filed: Apr. 4, 2018

(65) Prior Publication Data

US 2018/0221970 A1  Aug. 9, 2018

Related U.S. Application Data

(63) Continuation of application No. 14/563,103, filed on Dec. 8, 2014, now Pat. No. 9,962,774.

(51) Int. Cl.
*B23P 6/04* (2006.01)
*B23C 5/10* (2006.01)
*B23C 5/20* (2006.01)
*B23C 5/22* (2006.01)

(52) U.S. Cl.
CPC ............. *B23C 5/109* (2013.01); *B23C 5/207* (2013.01); *B23C 5/2221* (2013.01); *B23C 2200/0416* (2013.01); *B23C 2200/165* (2013.01); *B23C 2200/203* (2013.01); *B23C 2200/362* (2013.01); *B23C 2210/168* (2013.01)

(58) Field of Classification Search
CPC .. B23P 6/04; B23P 6/045; B23P 15/34; Y10T 29/49732
See application file for complete search history.

(56) References Cited

U.S. PATENT DOCUMENTS

| | | | | |
|---|---|---|---|---|
| 3,227,008 A * | 1/1966 | Celovsky | ............... | B23D 43/00 219/69.17 |
| 3,755,877 A * | 9/1973 | Thompson | ............... | B23P 6/04 29/402.13 |
| 3,803,950 A * | 4/1974 | Wasser | ...................... | B23C 5/18 76/115 |
| 4,187,891 A * | 2/1980 | Weill | ........................ | B23P 6/00 144/162.1 |
| 4,465,411 A * | 8/1984 | Boyce, Jr. | ............... | B23F 21/10 228/119 |
| 4,663,818 A * | 5/1987 | Erickson | ................. | B23B 27/00 29/426.3 |
| 8,316,543 B2 * | 11/2012 | Patzelt | .................... | B02C 4/305 29/402.04 |
| 2005/0164620 A1* | 7/2005 | Amamoto | ............... | B23C 5/006 451/548 |
| 2010/0272522 A1* | 10/2010 | Hecht | .................... | B23C 5/2221 407/103 |
| 2012/0093595 A1* | 4/2012 | Choi | ........................ | B23C 5/06 407/49 |
| 2016/0158853 A1* | 6/2016 | Davis | ...................... | B23C 5/109 407/34 |
| 2017/0001267 A1* | 1/2017 | Grunder | .................... | B23C 5/18 |
| 2019/0111502 A1* | 4/2019 | Hecht | ....................... | B25F 1/00 |

* cited by examiner

*Primary Examiner* — Willmon Fridie, Jr.
(74) *Attorney, Agent, or Firm* — Walters & Wasylyna LLC

(57) ABSTRACT

A cutting tool may include a cutter body, and a cutting insert group coupled to the cutter body, wherein the cutter body includes a working length, wherein the cutting insert group forms a continuous cutting edge, and wherein the continuous cutting edge extends continuously through the working length of the cutter body.

20 Claims, 11 Drawing Sheets

US 10,442,015 B2

CUTTING TOOL

PRIORITY

This application is a continuation of U.S. Ser. No. 14/563,103 filed on Dec. 8, 2014.

FIELD

The present disclosure is generally related to cutting tools and, more particularly, to a cutting tool including a continuous cutting edge formed by a plurality of cutting inserts.

BACKGROUND

Carbide cutting tools, such as end mills, are very abrasion resistant and can withstand higher temperatures than standard high-speed steel cutting tools. Carbide cutting surfaces are often used for machining through very hard materials (e.g., carbon steel or stainless steel) or in applications where other tools would more quickly wear away. Unfortunately, as the size of the required cutting tool increases, it is not economical to manufacture unitary carbide cutting tools.

A large carbide cutting tool can be formed by adding carbide cutting surfaces to a steel cutter body. Carbide strips can be brazed into a steel cutter body then precision-ground into an appropriate cutting geometry. However, the brazed carbide cutting tools still have a limited work cycle before the entire tool must be replaced. Alternatively, carbide cutting inserts can be mechanically secured to a steel cutter body. However, such cutting inserts can only be precision-ground prior to assembly and require precise positioning on the tool holder.

Accordingly, those skilled in the art continue with research and development efforts in the field of cutting tools, such as large-scale carbide cutting tools.

SUMMARY

In one embodiment, the disclosed cutting tool may include a cutter body, and a cutting insert group coupled to the cutter body, wherein the cutter body includes a working length, wherein the cutting insert group forms a continuous cutting edge, and wherein the continuous cutting edge extends continuously through the working length of the cutter body.

In another embodiment, the disclosed cutting tool may include a cutter body including a longitudinal axis and a working length, a flute formed in the cutter body and extending helically about the longitudinal axis, and a plurality of cutting inserts coupled to the cutter body within the flute, wherein the plurality of cutting inserts form a continuous cutting edge extending helically about the longitudinal axis, and wherein the continuous cutting edge extends continuously through the working length of the cutter body.

In yet another embodiment, the disclosed method for making a cutting tool may include the steps of: (1) forming a helical flute in a cutter body, (2) arranging a plurality of cutting inserts in an end-to-end orientation within the flute, and (3) forming a continuous cutting edge extending through a working length of the cutter body from the plurality of cutting inserts.

Other embodiments of the disclosed systems and method will become apparent from the following detailed description, the accompanying drawings and the appended claims.

DETAILED DESCRIPTION

Figure 1:
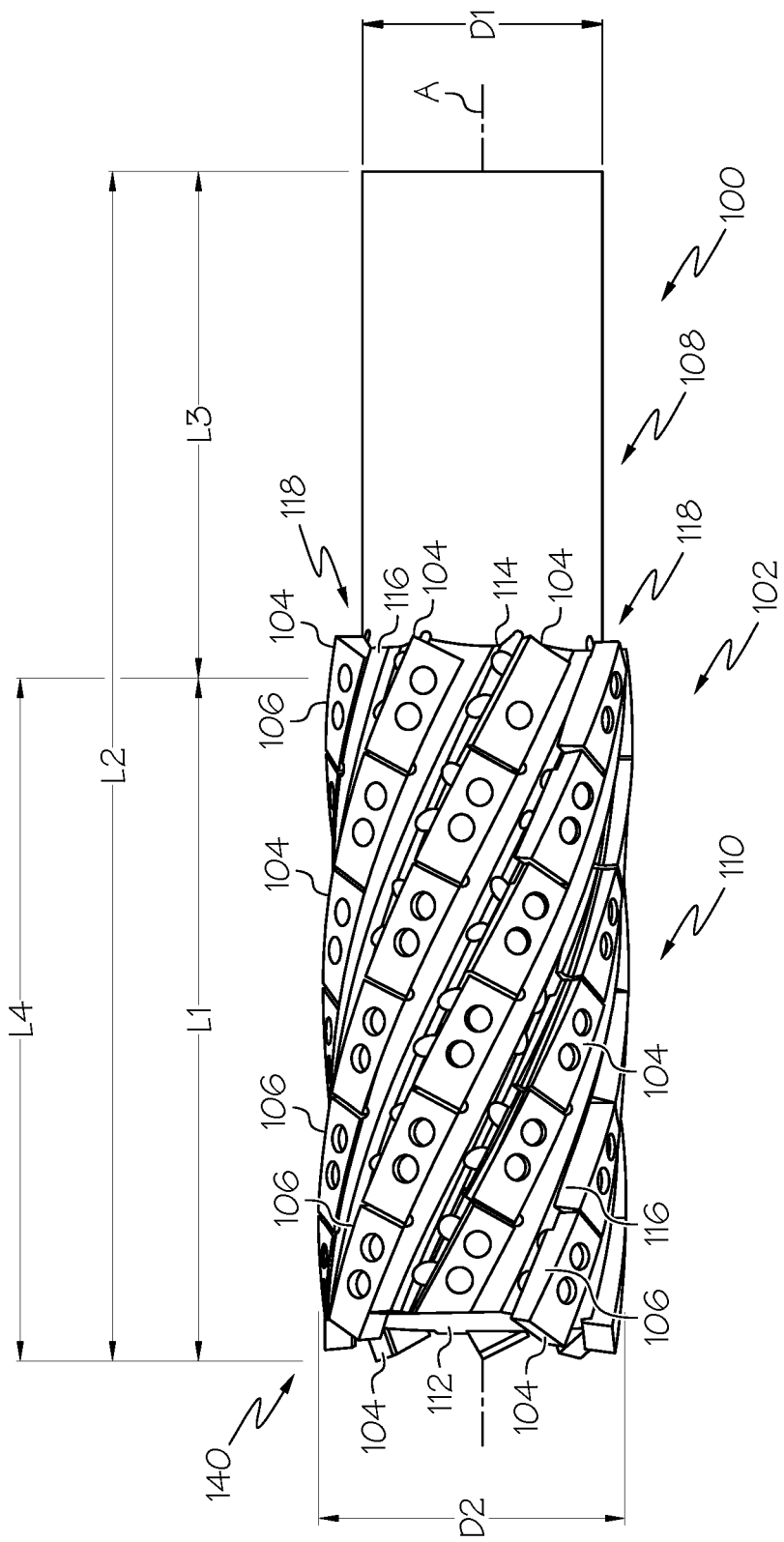
FIG. 1 is a schematic side elevational view of one embodiment of the disclosed cutting tool.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed cutting tool, generally designated 100, may include a cutter body 102 and a cutting insert group 118 coupled to the cutter body 102. The cutter body 102 may include a substantially cylindrical shape having a longitudinal (e.g., center) axis A. The cutter body 102 may include an axial working length L1 (e.g., an effective axial length along the longitudinal axis A). The cutting insert group 118 may form a continuous cutting edge 106. The continuous cutting edge 106 may extend continuously through the full working length L1 (e.g., substantially the entire working length L1) of the cutter body 102. As used herein, "substantially" means within manufacturing tolerances.

The cutter body 102 may include an overall axial length L2. The cutter body 102 may include a cutter shank 108 and a cutter head 110. In one example construction, the cutter body 102 may be made from steel. Other suitable materials may also be used to make the cutter body 102.

The cutter shank 108 may include an axial length L3 and a diameter (e.g., shank diameter) D1. The cutter shank 108 may be configured to be (e.g., capable of being) inserted and secured within a rotating spindle of a machine (e.g., a milling machine) (not shown). For example, the cutter shank 108 may include any shape and/or design suitable for insertion and securing within a clamp or chuck of the spindle, as is well known in the art.

The cutter head 110 may include a substantially cylindrical shape. The cutter head 110 may extend co-axially (e.g., along longitudinal axis A) from the cutter shank 108 to an end face 112. The cutter head 110 may include an axial length L4 and a diameter (e.g., head diameter) D2. The length L4 of the cutter head 110 may define (e.g., may be substantially equal to) the working length L1 of the cutter body 102. The diameter D2 of the cutter head may be define a working diameter of the cutter body 102.

Figure 3:
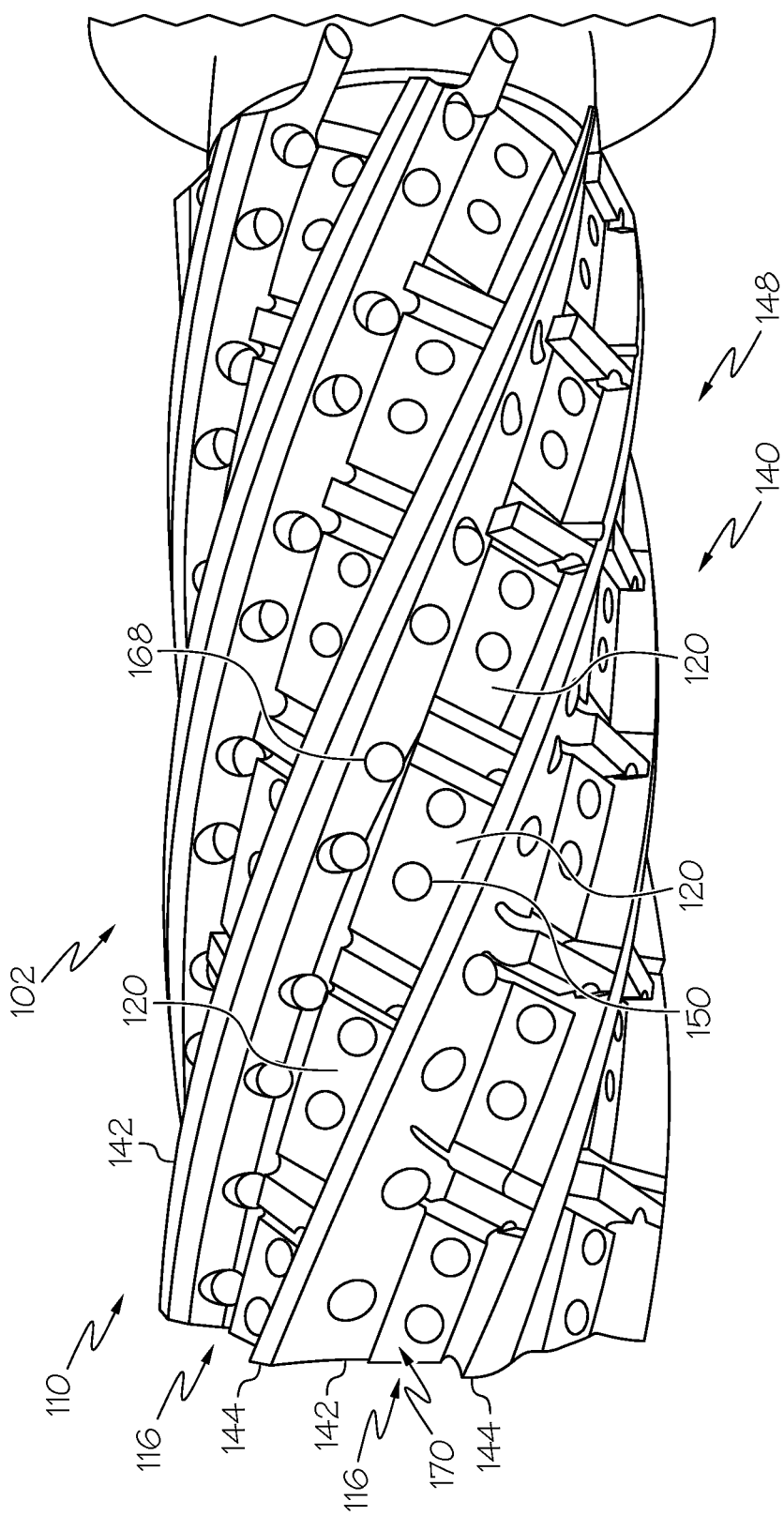
FIG. 3 is a partial schematic side elevational view of one embodiment of the disclosed cutting tool, shown with the cutting inserts removed from a cutter body.
Figure 4:
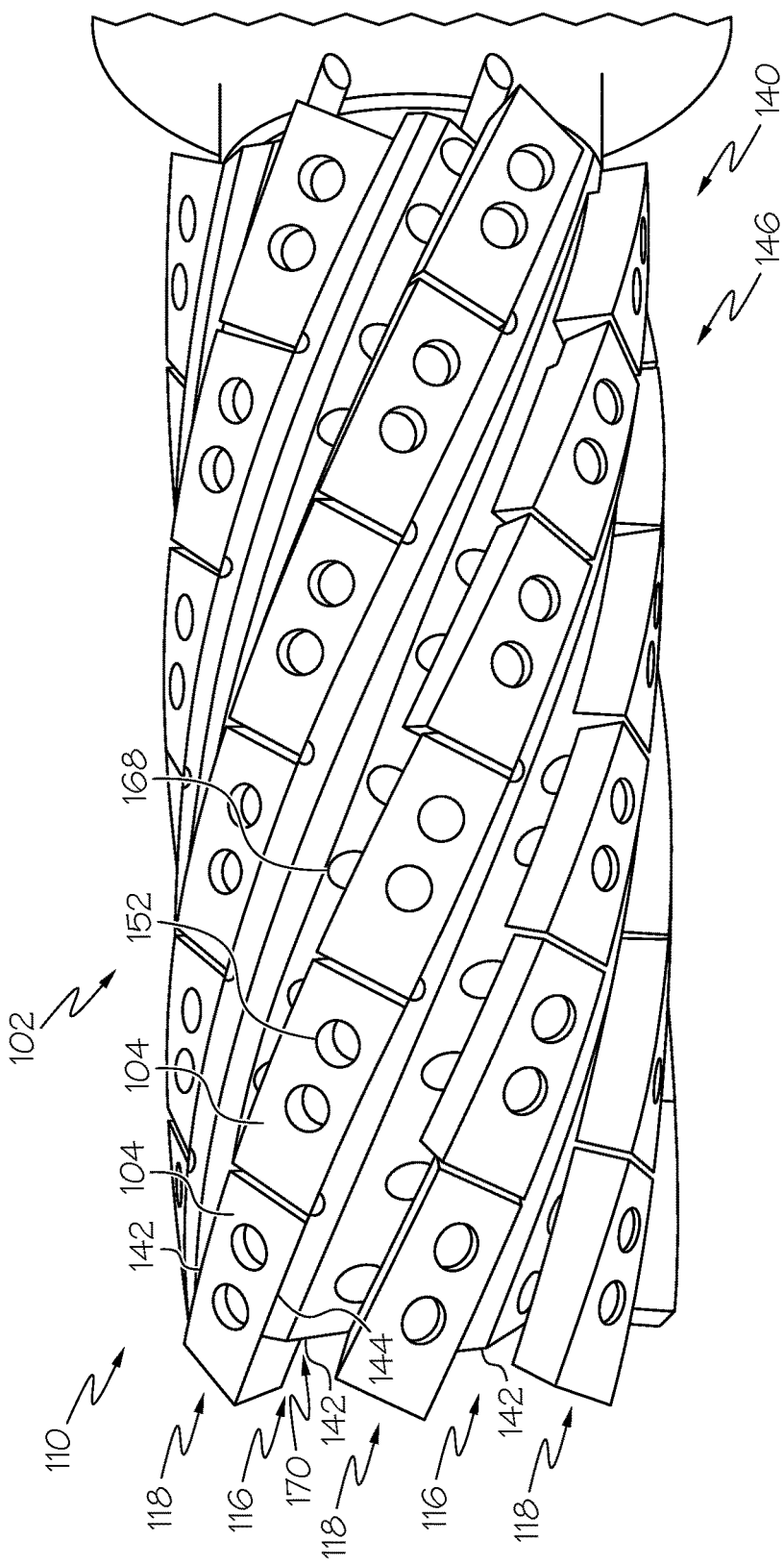
FIG. 4 is a partial schematic side elevational view of one embodiment of the cutting tool, shown with the cutting inserts coupled to the cutter body prior to being precision-ground.
Figure 5:
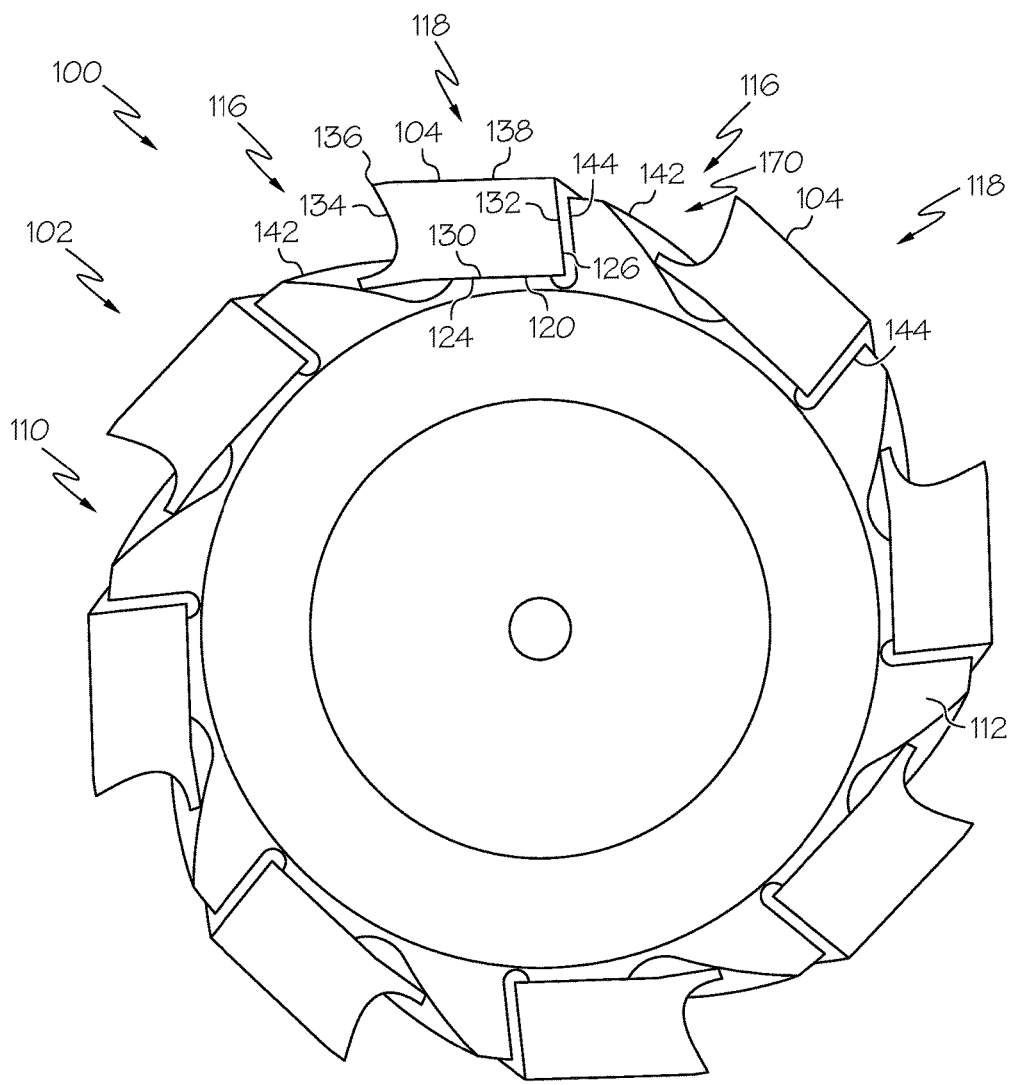
FIG. 5 is a schematic end view of one embodiment of the disclosed cutting tool.

Referring to FIGS. 1, 3 and 5, in one example embodiment, the cutter head 110 may include a flute 116 (e.g., one or more flutes 116). The flute 116 may include a groove 170 (FIGS. 4 and 5) formed in an exterior surface 114 of the cutter body 102. The flute 116 may extend through the full working length L1 (e.g., substantially the entire working length L1) of the cutter body 102. As one example, the flute 116 may extend longitudinally from proximate (e.g., at or near) the cutter shank 108 to proximate the end face 112. Thus, the flute 116 may have an effective axial length (e.g., along the longitudinal axis A) substantially equal to the length L4 of the cutter head 110 (or the working length L1 of the cutter body 102).

Referring to FIGS. 1 and 4, the cutting insert group 118 may be coupled to the cutter body 102 within the flute 116. The continuous cutting edge 106 (formed by the cutting insert group 118) may extend along the flute 116. As one example, the cutting insert group 118 may extend longitudinally from proximate the cutter shank 108 to proximate the end face 112 of the cutter body 102. Thus, the continuous cutting edge 106 may have an effective axial length (e.g., along the longitudinal axis A) substantially equal to the length L4 of the cutter head 110 (or the working length L1 of the cutter body 102).

In one example construction, the working length L1 of the cutting tool 100 (or the effective axial length of the continuous cutting edge 106) may be at least 2 inches. In another example construction, the working length L1 of the cutting tool 100 (or the effective axial length of the continuous cutting edge 106) may be at least 14 inches. In another example construction, the working length L1 of the cutting tool 100 (or the effective axial length of the continuous cutting edge 106) may be at least 17 inches. In yet another example construction, the working length L1 of the cutting tool 100 (or the effective axial length of the continuous cutting edge 106) may be at least 40 inches.

In the examples illustrated herein, the cutting tool 100 is embodied as an end mill (e.g., a milling cutter) used in milling machines to perform milling operations. However, the cutting tool 100 may be embodied as other types of cutters and/or bits to perform other machining operations (e.g., drilling, boring, etc.).

Those skilled in the art will appreciate that the disclosed cutting tool 100 is not limited by the number of flutes 116 formed in the cutter body 102 (e.g., the cutter head 110). For example, the embodiments of the disclosed cutting tool 100 illustrated in FIGS. 1, 3-5 and 14 include a total of eight flutes 116. However, any number of flutes 116 (e.g., two, three, four, five, six, seven, ten, etc.) is also contemplated.

Referring to FIG. 1, once the cutting insert group 118 has been coupled to the cutter body 102 (e.g., coupled to the cutter head 110 within the flute 116), at least a portion of the continuous cutting edge 106 may be precision-ground to a desired cutting geometry. For example, the entire continuous cutting edge 106 may be precision-ground along substantially all its running length (e.g., cutting edge length) after being coupled to the cutter body 102, in order to form the continuous cutting edge 106 having the desired cutting geometry. As one example, the continuous cutting edges 106 (formed by one or more cutting insert groups 118) may be precision-ground (e.g., by a CNC precision-grinding machine) to a specified cutting diameter. The cutting diameter may define the diameter D2 of the cutter head 110 (or the working diameter of the cutter body 102). As another example, the continuous cutting edges 106 may be precision-ground to a specified cutting edge shape (e.g., cutting tooth shape).

In one example construction, the cutting diameter (or the diameter D2 of the cutter head 110) may be at least 2 inches. In another example construction, the cutting diameter (or the diameter D2 of the cutter head 110) may be at least 2.5 inches. In another example construction, the cutting diameter (or the diameter D2 of the cutter head 110) may be at least 3 inches. In another example construction, the cutting diameter (or the diameter D2 of the cutter head 110) may be at least 3.5 inches. In yet another example construction, the cutting diameter (or the diameter D2 of the cutter head 110) may be greater than 4 inches.

Figure 2:
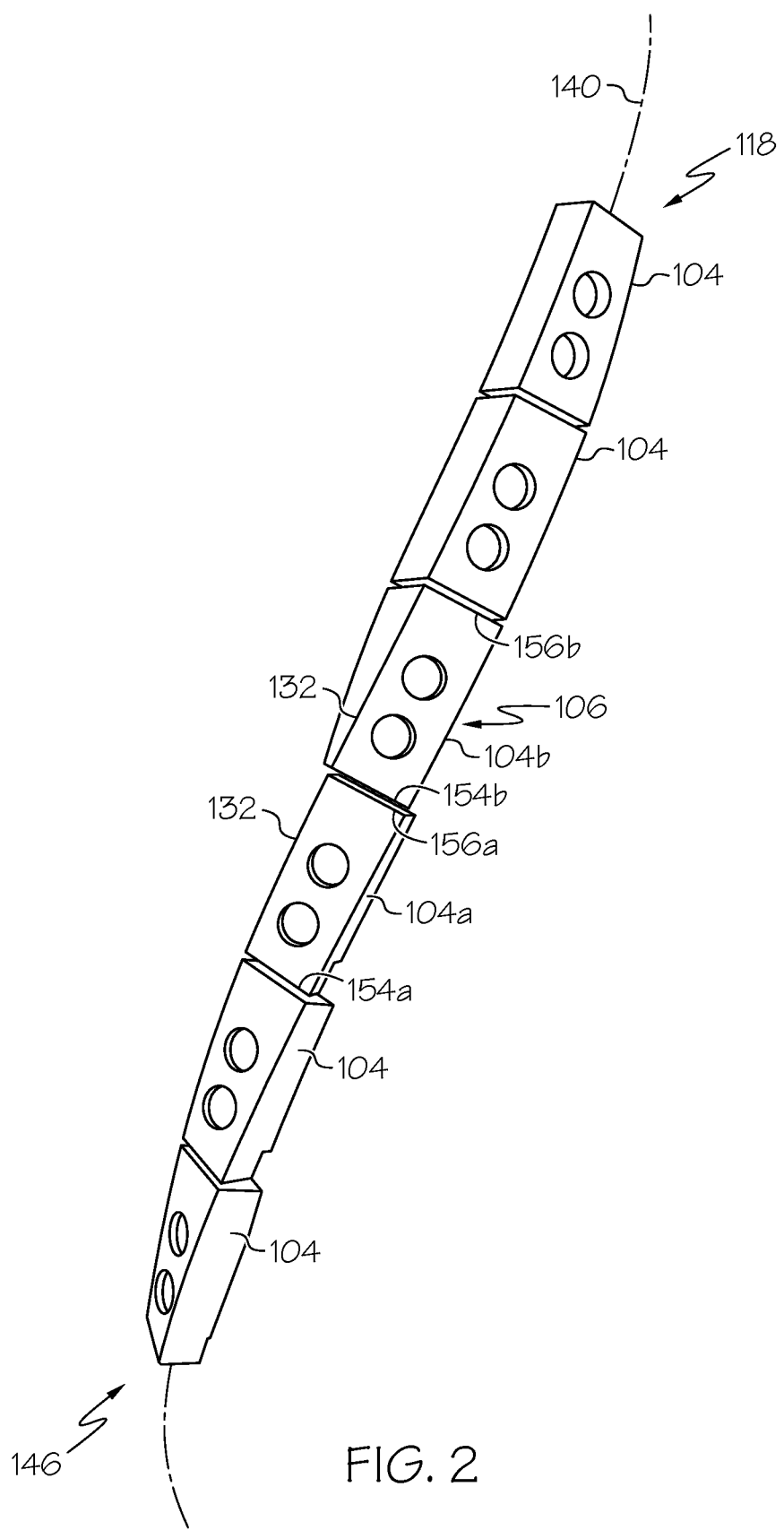
FIG. 2 is a schematic perspective view of one embodiment of cutting inserts arranged in an end-to-end orientation forming a cutting insert group of the disclosed cutting tool.

Referring to FIGS. 1-3, in one example embodiment, the flute 116 may be helical. For example, the flute 116 may be formed (e.g., cut or carved) into the exterior surface 114 of the cutter head 110 in a helical pattern 140 (e.g., extending helically about the longitudinal axis A). Similarly, the continuous cutting edge 106 formed by the cutting insert group 118 coupled to the cutter body 102 along the flute 116 may be helical (e.g., extending helically about the longitudinal axis A).

FIG. 2 illustrates one example of the helical pattern 140 (e.g., having a helix angle relative to the longitudinal axis A) of the cutting insert group 118 and the continuous cutting edge 106. As one specific, non-limiting example, the cutting tool 100 may include a cutting diameter (e.g., formed by the continuous cutting edges 106) of approximately 3 inches and the flute 116 and/or the continuous cutting edge 106 may include a 28-degree helix angle. As another specific, non-limiting example, the cutting tool 100 may include a cutting diameter of approximately 3.5 inches and the flute 116 and/or the continuous cutting edge 106 may include a 32-degree helix angle.

Those skilled in the art will recognize that the running length (e.g., helical length) of a helically wound continuous cutting edge 106 and/or helically wound flute 116 may depend upon the working length L1 of the cutter body 102, the diameter D2 of the cutter head 110, and/or the helix angle. As one example, the running length of the helical continuous cutting edge 106 and/or helical flute 116 may be greater (e.g., longer) than the effective axial length of the helical continuous cutting edge 106 and/or helical flute 116, respectively.

Referring to FIGS. 3-5, in one example construction, the flute 116 may be formed between a leading face 142 and a trailing face 144 of the exterior surface 114. The cutting insert group 118 may be coupled to the cutter head 110 of the cutter body 102 between the leading face 142 and a trailing face 144. Thus, in the illustrated embodiments, when the cutting insert group 118 is coupled to the cutter head 110, the flute 116 may define the material-collecting (e.g., chip-collecting) groove 170 located between the cutting insert group 118 and the leading face 142. Each leading face 142 and trailing face 144 may be generally parallel and spiral along the exterior surface 114 of the cutter head 110 (e.g., in the helical pattern 140). At any cross-sectional point on the cutter head 110 the trailing face 144 may be substantially radial to the longitudinal axis A of the cutter body 102.

Referring to FIGS. 1, 2 and 4, the cutting insert group 118 may include cutting inserts 104 (e.g., a plurality of cutting inserts 104). The cutting inserts 104 may be arranged in an end-to-end orientation 146 and extend continuously through the full working length L1 of the cutter body 102. As one example, the cutting inserts 104 may be arranged in the end-to-end orientation 146 along (e.g., within) each flute 116 to define the cutting insert group 118. As another example, the cutting inserts 104 may be arranged in an end-to-end orientation 146 along each helical flute 116 to define a helical cutting insert group 118 and the helical continuous cutting edge 106 (FIG. 2). Thus, the continuous cutting edge 106 may form the cutting tooth of the flute 116.

The cutting inserts 104 may be made of solid metal carbide. As one general, non-limiting example, the cutting inserts 104 may be made of tungsten carbide and cobalt. As one specific, non-limiting example, the cutting inserts 104 may be made of 94 percent tungsten carbide and 6 percent cobalt (e.g., for machining aluminum). As another specific, non-limiting example, the cutting inserts 104 may be made of 90 percent tungsten carbide and 10 percent cobalt (e.g., for machining titanium). Other solid metal carbide materials are also contemplated.

Those skilled in the art will appreciate that the disclosed cutting tool 100 is not limited by the number of cutting insert groups 118 coupled to the cutter body 102 or the number of continuous cutting edges 106. As one example, the total number of flutes 116 may dictate the number of cutting insert groups 118 and the number of continuous cutting edges 106. As shown in the illustrated embodiments, there may be a one-to-one correspondence between the number of flutes 116 and the number of cutting insert groups 118.

Those skilled in the art will also appreciate that the disclosed cutting tool 100 is not limited by the number of cutting inserts 104 arranged in the end-to-end orientation 146 to form each cutting insert group 118. As one example, the total number of cutter inserts 104 forming the cutting insert group 118 and, thus, the running length of the continuous cutting edge 106, may be dictated by the working length L1 of the cutting tool 100, the diameter D2 of the cutter head 110 and/or the helix angle of the flute 116 and/or the continuous cutting edge 106.

Figure 6:
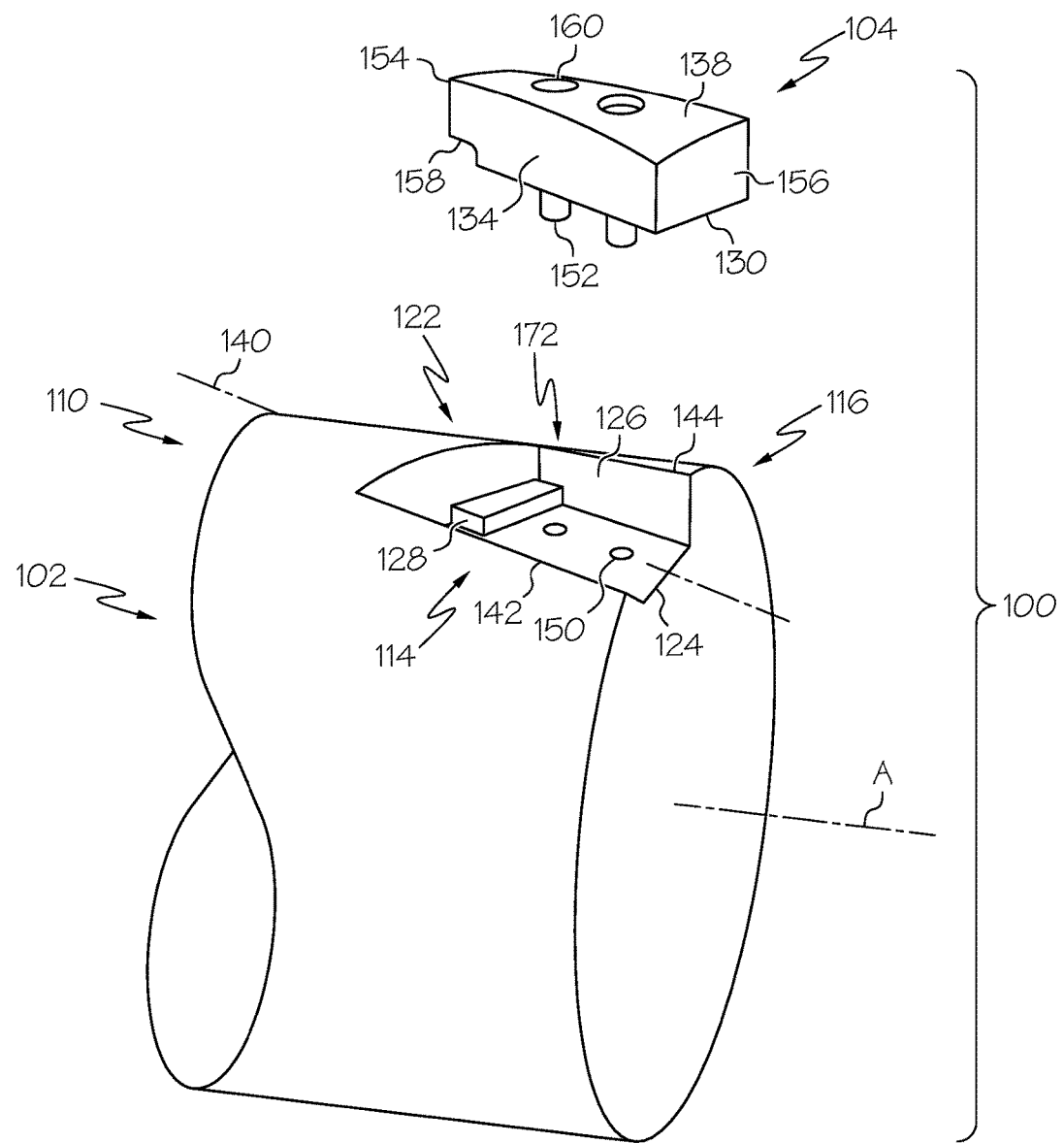
FIG. 6 is an exploded, partial schematic perspective view of one embodiment of the disclosed cutting tool.

Referring to FIGS. 3 and 6, in one example embodiment, the cutting tool 100 may include pockets 120 (e.g., a plurality of pockets 120) formed in the cutter head 110 of the cutter body 102. The pockets 120 may extend along the flute 116. As one example, the pockets 120 may extend longitudinally from proximate the cutter shank 108 to proximate the end face 112 of the cutter body 102 within the flute 116. As one example, the pockets 120 may be located between the leading face 142 and the trailing face 144. The pockets 120 may be arranged in an end-to-end orientation 148 (FIG. 3) within the flute 116.

Referring to FIG. 6, each pocket 120 may form a recess 172 within the exterior surface 114 of the cutter head 110 (e.g., between the leading face 142 and the trailing face 144 within the flute 116) capable of receiving an individual cutting insert 104 (FIG. 1). The pockets 120 may follow the same helical pattern 140 as that of the flute 116. Each individual cutting insert 104 may be removably coupled to the cutter head 110 within each pocket 120. As one example, the pocket 120 may include threaded fastening holes 150.

The cutting insert 104 may be removably coupled to the cutter head 110 by threaded fasteners 152 extending through the cutting insert 104.

The pocket 120 may substantially conform to at least a portion of the shape of the cutting insert 104. As one example, the pocket 120 may be defined by one or more cutting insert support surfaces 122 formed (e.g., cut or carved) into the exterior surface 114 of the cutter head 110 capable of supporting and being in surface contact with at least a portion of the cutting insert 104.

As one example, the pocket 120 may form a three-point surface mounting system in which the cutting insert 104 positively engages the cutting insert support surfaces 122. As one example construction, the cutting insert support surfaces 122 may include a floor 124, a longitudinal sidewall 126 extending upwardly from the floor 124, and a lateral shoulder 128 extending upwardly from the floor 124. As one example, the floor 124 may be defined by the exterior surface 114 of the cutter head 110 located between the leading face 142 and the trailing face 144 (e.g., a portion of a bottom surface of the flute 116) and the sidewall 126 may be defined by the trailing face 144 of the exterior surface 114. The shoulder 128 may extend laterally from the sidewall 126 and at least partially across the floor 124.

Referring to FIGS. 7-13, in one example embodiment, the cutting insert 104 may include a bottom surface 130, a top surface 138, a longitudinal back face 132, a longitudinal front face 134 laterally opposite the back face 132, a lateral first end 154, and a lateral second end 156 longitudinally opposite the first end 154. A recess 158 may be formed (e.g., cut or carved) into the bottom surface 130 proximate the first end 154. An intersection between the top surface 138 and the front face 134 of the cutting insert 104 may form (e.g., define) an edge 136. Edges 136 of the plurality of cutting inserts 104 arranged in the end-to-end orientation 146 (e.g., forming the cutting insert group 118) may form the continuous cutting edge 106 (FIG. 2).

Figure 7:
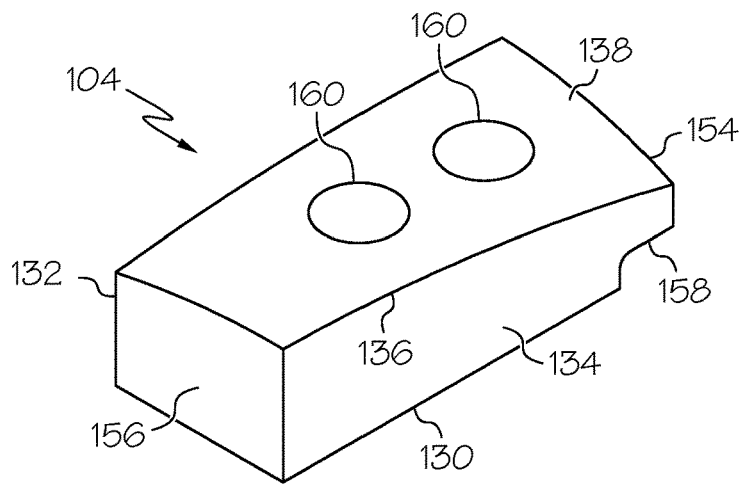
FIG. 7 is a schematic perspective view of one embodiment of the cutting insert.

Referring to FIGS. 6 and 7, when seating the cutting insert 104 within the pocket 120 (FIG. 6), the bottom surface 130 may be in surface contact (e.g., mate) with and be supported by the floor 124. The recess 158 may be in surface contact (e.g., mate) with and be supported by the shoulder 128. The back face 132 may be in surface contact (e.g., mate) with and be supported by the sidewall 126. In one example construction, the bottom surface 130, the back face 132, and the recess 158 of the cutting insert 104 and the floor 124, the sidewall 126, and the shoulder 128 of the pocket 120 may be substantially flat, cooperating surfaces.

Upon seating the cutting insert 104 within the pocket 120, the cutting insert 104 may be tightly secured to the cutter head 110 within the pocket 120 by the fasteners 152 (e.g., Allen or Torx screws). The cutting insert 104 may include clearance holes 160 extending through the cutting insert 104 (e.g., from the top surface 138 to the bottom surface 130) suitable to receive the fasteners 152.

Figure 8:
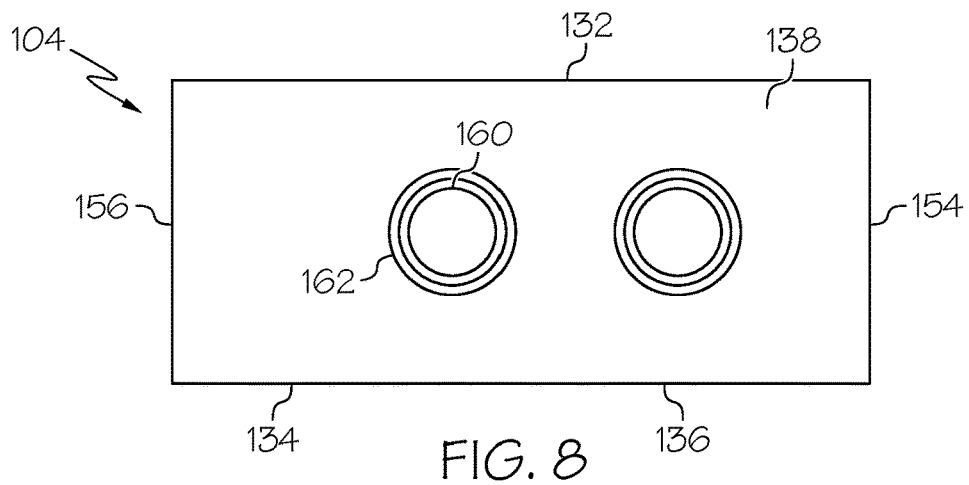
FIG. 8 is a schematic top plan view of the cutting insert of FIG. 7.
Figure 9:
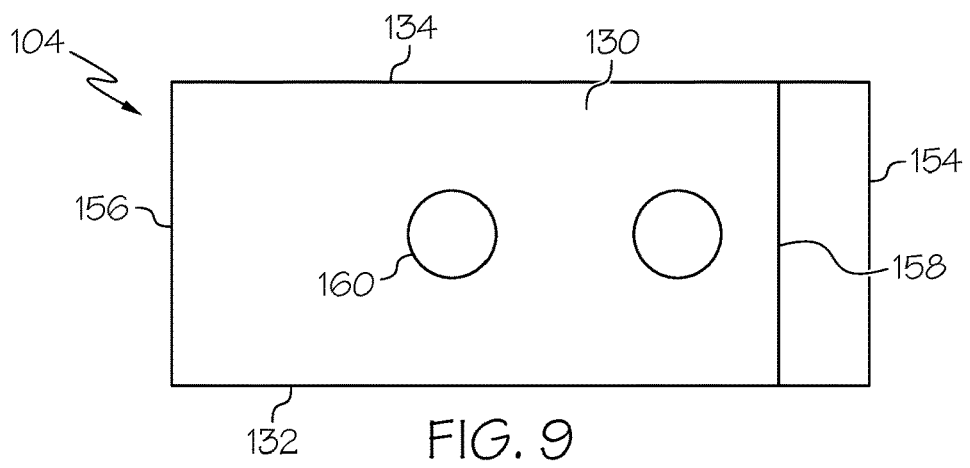
FIG. 9 is a schematic bottom plan view of the cutting insert of FIG. 7.
Figure 10:
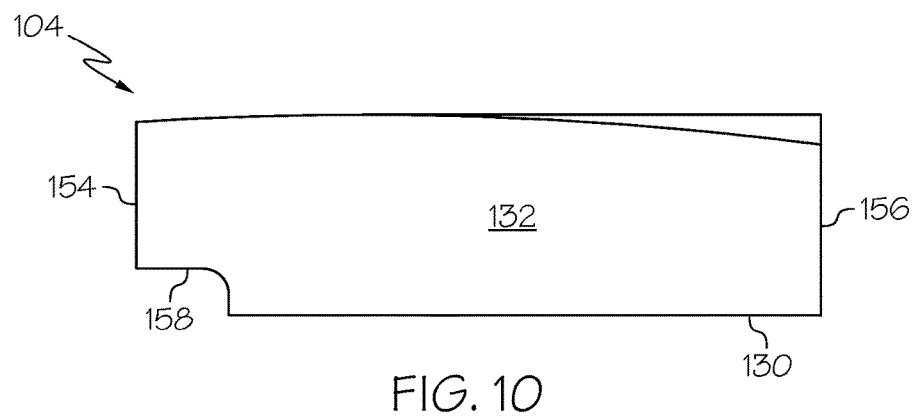
FIG. 10 is a schematic back side elevational view of the cutting insert of FIG. 7.
Figure 11:
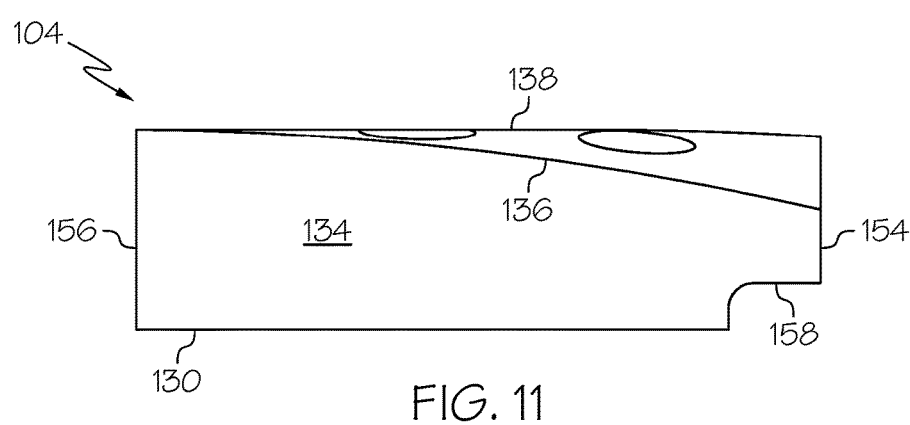
FIG. 11 is a schematic front side elevational view of the cutting insert of FIG. 7.
Figure 12:
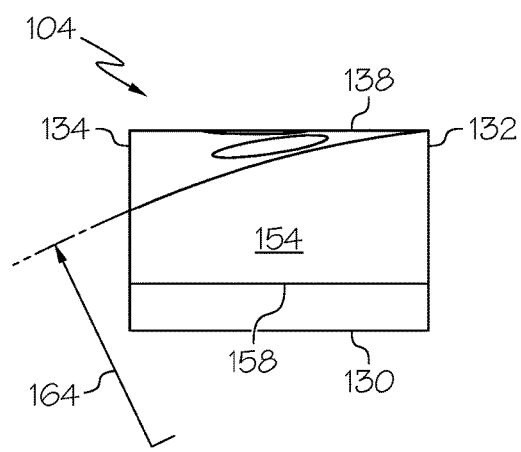
FIG. 12 is a schematic first end view of the cutting insert of FIG. 7.
Figure 13:
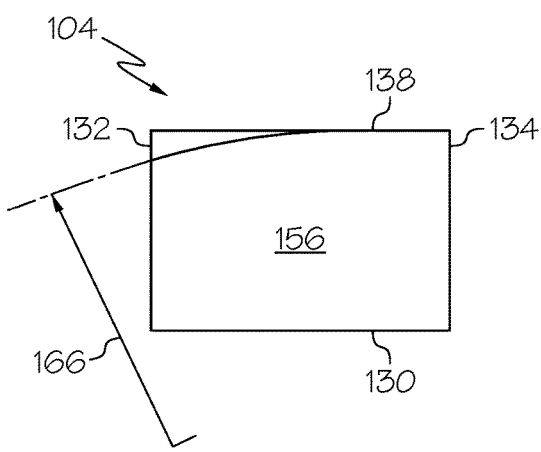
FIG. 13 is a schematic second end view of the cutting insert of FIG. 7.

Referring to FIG. 8, in one example construction, the clearance holes 160 may include a tapered counter bore 162, which may be engaged by a corresponding tapered surface on a head of the fastener 152, thereby allowing the cutting insert 104 to be tightly secured within the pocket 120. The counter bore 162 may also allow the head of the fastener 152 to be flush with or below the top surface 138 (as best illustrated in FIG. 6) of the cutting insert 104 to prevent the fastener 152 from creating an obstruction.

Referring to FIGS. 2, 3, 5 and 7-13, the cutting inserts 104 may be seated within the pockets 120 (e.g., in surface contact with and supported by the cutting insert support surfaces 122) in the end-to-end orientation 146 (FIG. 2) to form the cutting insert group 118. As one example, individual cutting inserts 104 (identified in FIG. 2 as cutting insert 104a including a first end 154a and a second end 156a and cutting insert 104b including a first end 154b and a second end 156b) may arranged such that a first end 154b of the cutting insert 104b is butted up to and generally aligned with a second end 156a of the directly adjacent cutting insert 104a. Once all of the cutting inserts 104 are seated in the pockets 120 and coupled to the cutter head 110 in the end-to-end orientation 146, the continuous cutting edge 106 may be formed by the plurality of edges 136 of the plurality of cutting inserts 104. Thus, the cutting inserts 104 forming the cutting insert group 118 may be generally aligned and may follow the helical pattern 140 of the flute 116, as best illustrated in FIG. 2. The back faces 132 of the cutting inserts 104 may be aligned along the trailing face 144 of the exterior surface 114 (e.g., the sidewall 126 of the pocket 120), as best illustrated in FIG. 5.

Referring to FIGS. 2 and 4, in one example embodiment, the front face 134 and the top surface 138 of each cutting insert 104 may initially be substantially flat. Thus, the edge 136 of each cutting insert 104 and the continuous cutting edge 106 defined by the edges 136 of the cutting inserts 104 arranged in end-to-end orientation 146 (e.g., the cutting insert group 118) and coupled to the cutter body 102 may initially be unfinished (e.g., unshaped).

Figure 14:
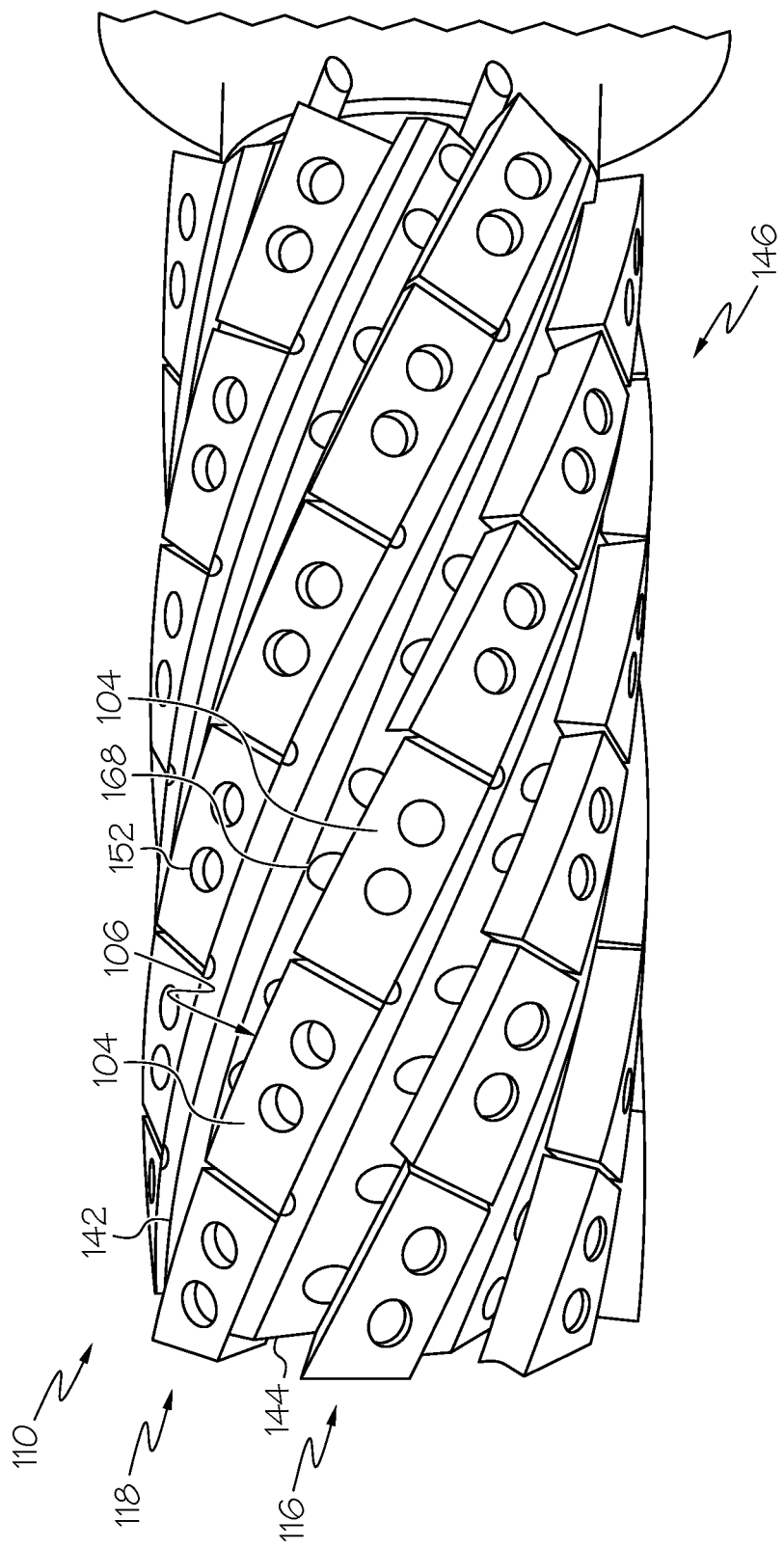
FIG. 14 is a partial schematic side elevational view of one embodiment of the cutting tool, shown with the cutting inserts coupled to cutter body after being precision-ground.

Referring to FIGS. 5 and 14, once the cutting inserts 104 have been seated and secured within the pockets 120 (FIG. 5) and arranged in the end-to-end orientation 146, at least one of the top surfaces 138 and/or the front faces 134 of the cutting inserts 104 may be precision-ground to shape the entire continuous cutting edge 106 (e.g., substantially all of the running length of the continuous cutting edge 106) formed by the cutting insert group 118 (e.g., the plurality of cutting inserts 104) to the specified cutting geometry.

Referring to FIGS. 7-13, in one example embodiment, the top surface 138 may be precision-ground to be contoured between the back face 132 and the front face 134 to form (e.g., shape) the continuous cutting edge 106. The contoured (e.g., curved or rounded) top surface 138 may have a radius 164 (FIG. 12) proximate the first end 154. The contoured top surface 138 may have a radius 166 (FIG. 13) proximate the second end 156. As one example, the contoured top surface 138 may have a constant radius relative to the center axis A of the cutter body 102 (FIG. 1) and the helix angle of flute 116 from proximate the first end 154 to proximate the second end 156 (e.g., radius 164 is equal to radius 166). As another example, the contoured top surface 138 may have a variable radius relative to the center axis A of the cutter body 102 and the helix angle of flute 116 from proximate the first end 154 to proximate the second end 156 (e.g., radius 164 is different than radius 166).

In one example embodiment, the front face 134 may be precision-ground to be contoured between the top surface 138 and the bottom surface 130 to form (e.g., shape) the continuous cutting edge 106. As one example, the front face 134 may constantly contoured from proximate the first end 154 to proximate the second end 156 relative to the center axis A of the cutter body 102 (FIG. 1) and the helix angle of flute 116. As another example, the front face 134 may variably contoured from proximate the first end 154 to proximate the second end 156 relative to the center axis A of the cutter body 102 and the helix angle of flute 116.

Accordingly, the disclosed cutting tool 100 may enable formation of the continuous cutting edge 106 formed by the cutting inserts 104 arranged in the end-to-end orientation 146 (e.g., as the cutting insert group 118) along the flute 116 formed in the cutter head 110 of the cutter body 102. The ability to precision-grind the continuous cutting edge 106 as a continuous, unitary cutting edge (e.g., cutting tooth) extending substantially the entire working length L1 of the cutting tool 100 (e.g., substantially all of the running length of the continuous cutting edge 106), may eliminate the requirements of precision-grinding the edge 136 of each individual cutting insert 104 and precisely locating of each cutting insert 104 on the cutter body 102, thereby reducing cost and simplifying the formation of complex cutting edge configurations.

One or more individual cutting inserts 104 of the cutting insert group 118 may be removed and/or replaced when worn or damaged. Upon replacing one or more cutting inserts 104 (e.g., removably coupling one or more new cutting insert 104 to the cutter body 102), a new continuous cutting edge 106 may be formed by the new cutting inserts 104 (or a combination of existing and replaced cutting inserts 104). For example, the one or more new cutting inserts 104 or the new cutting inserts 104 and the existing cutting inserts 104 may be precision-ground to shape the new continuous cutting edge 106.

Referring to FIGS. 1, 3, 4 and 14, in one example embodiment, cutter body 102 may include internal coolant holes 168. As one example construction, the coolant holes 168 may be located within the flute 116. For example, the coolant holes 168 may be located within the portion of the flute 116 forming the chip-collecting groove 170 between the front face 134 of the cutting insert 104 and the leading face 142 of the flute 116. The coolant holes 168 may follow the same helical pattern 140 as the flute 116.

Figure 15:
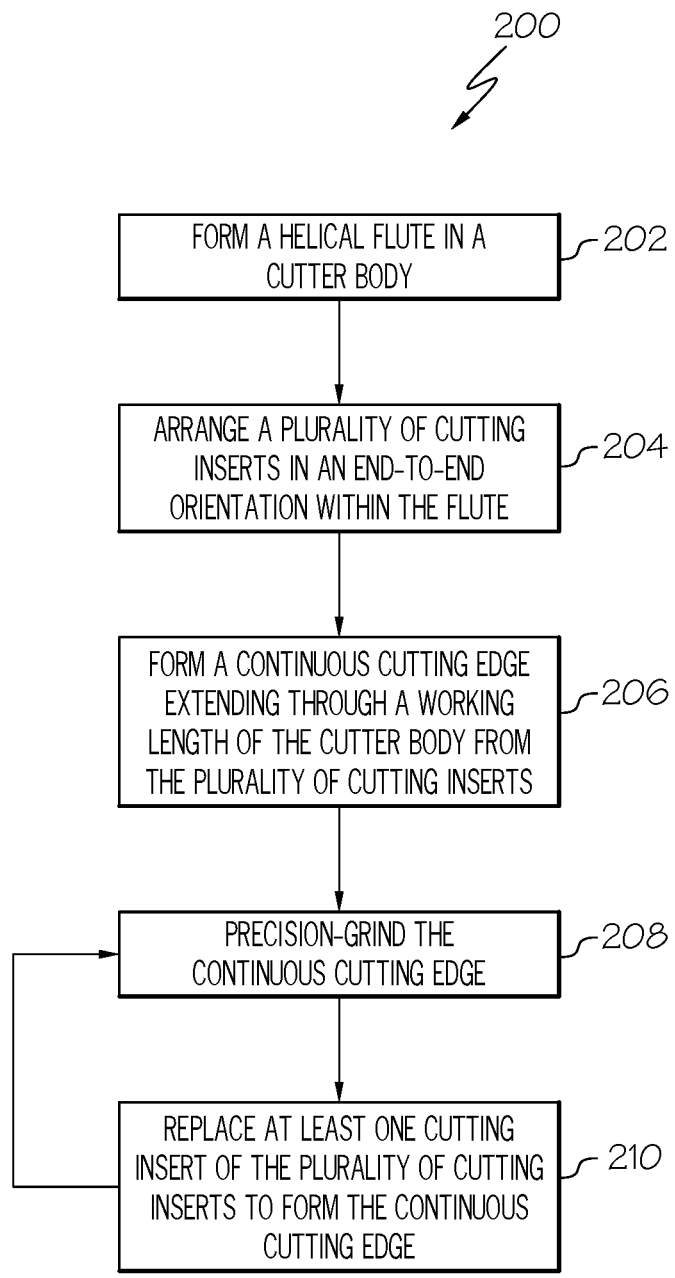
FIG. 15 is a flow diagram of one embodiment of the disclosed method for making a cutting tool.

Referring to FIG. 15, and with reference to FIGS. 1-14, one embodiment of the disclosed method, generally designated 200, for making the cutting tool 100 may begin by forming the flute 116 (e.g., the helical flute 116) in the cutter body 102 (e.g., in the cutter head 110), as shown at block 202.

As shown at block 204, the plurality of cutting inserts 104 may be arranged in the end-to-end orientation 146 within the flute 116. As one example, the plurality of cutting inserts 104 may be seated in the plurality of pockets 120 and coupled (e.g., removably coupled) to the cutter body 102 in the end-to-end orientation 146 within the flute 116.

As shown at block 206, the continuous cutting edge 106 may be formed from the cutting inserts 104 (e.g., by the plurality of edges 136 extending continuously through the full working length L1 of the cutter body 102).

As shown at block 208, the continuous cutting edge 106 may be precision-ground. For example, the entire continuous cutting edge 106 may be precision-ground along substantially all of its running length (e.g., helical length). The continuous cutting edge 106 may be precision-ground without removing the plurality of cutting inserts 104 from the cutter body 102.

As shown at block 210, at least one cutting insert 104 of the plurality of cutting inserts 102 (e.g., forming the cutting insert group 118) may be removed and replaced. For example, one or more cutting inserts 104 may be removed and replaced when worn or damaged.

The continuous cutting edge 106 formed by the original cutting inserts 104 and the replaced (or new) cutting inserts 104 may be precision-ground (e.g., reground), as shown at block 208.

Figure 16:
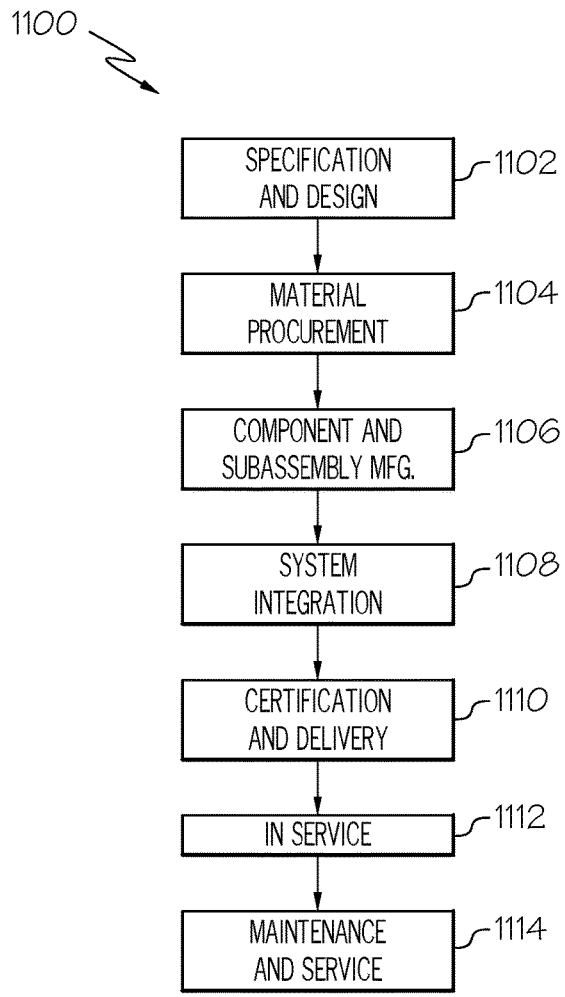
FIG. 16 is flow diagram of an aircraft manufacturing and service methodology.
Figure 17:
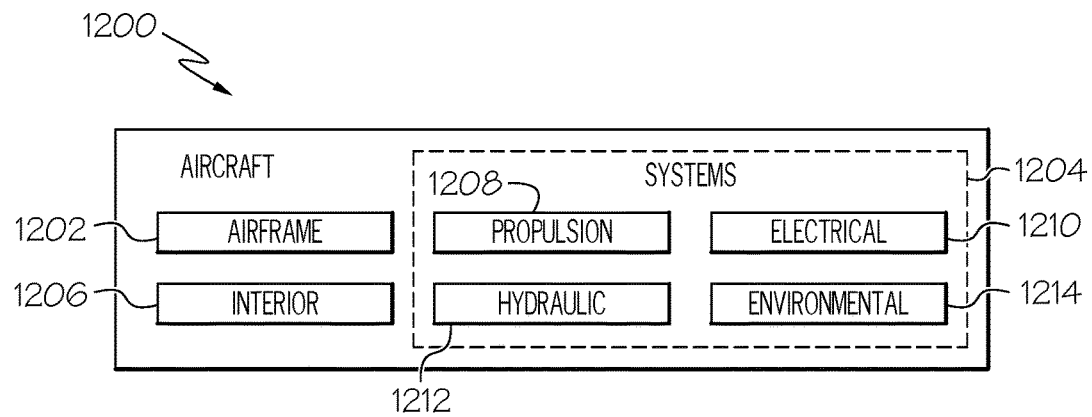
FIG. 17 is a block diagram of an aircraft.

Examples of the present disclosure may be described in the context of an aircraft manufacturing and service method 1100 as shown in FIG. 16 and an aircraft 1200 as shown in FIG. 17. During pre-production, the illustrative method 1100 may include specification and design, as shown at block 1102, of the aircraft 1200 and material procurement, as shown at block 1104. During production, component and subassembly manufacturing, as shown at block 1106, and system integration, as shown at block 1108, of the aircraft 1200 may take place. Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, the aircraft 1200 produced by illustrative method 1100 (FIG. 16) may include airframe 1202 with a plurality of high-level systems 1204 and interior 1206. Examples of high-level systems 1204 may include one or more of propulsion system 1208, electrical system 1210, hydraulic system 1212, and environmental system 1214. Any number of other systems may be included. Although an aerospace example is shown, the principles disclosed herein may be applied to other industries, such as the automotive and marine industries. Accordingly, in addition to the aircraft 1200, the principles disclosed herein may apply to other vehicles (e.g., land vehicles, marine vehicles, space vehicles, etc.).

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, method, or combination thereof may be utilized during production stages (blocks 1106 and 1108), for example, by substantially expediting assembly of or reducing the cost of aircraft 1200. Similarly, one or more examples of the apparatus or method realizations, or a combination thereof, may be utilized, for example and without limitation, while aircraft 1200 is in service (block 1112) and/or during the maintenance and service stage (block 1114).

Although various embodiments of the disclosed cutting tool and method have been shown and described, modifications may occur to those skilled in the art upon reading the specification. The present application includes such modifications and is limited only by the scope of the claims.

What is claimed is:

1. A method for repairing a cutting tool comprising a cutter body having a working length and a plurality of cutting inserts removably connected to said cutter body, each cutting insert of said plurality of cutting inserts comprising a first end, a second end opposite said first end, and an insert-cutting edge extending from said first end to said second end, wherein at least one cutting insert of said plurality of cutting inserts is a worn or damaged cutting insert, said method comprising:

removing said worn or damaged cutting insert from said cutter body;
connecting a replacement cutting insert to said cutter body at a location where said worn or damaged cutting insert was removed; and
shaping an unfinished cutting edge comprising said replacement cutting insert and remaining ones of said plurality of cutting inserts to form a continuous unitary finished cutting edge extending substantially entirely along said working length of said cutter body.

2. The method of claim 1 further comprising precision-grinding said continuous unitary finished cutting edge.

3. The method of claim 1 wherein said shaping said unfinished cutting edge is performed without removal of any of said plurality of cutting inserts from said cutter body.

4. The method of claim 1 wherein said shaping said unfinished cutting edge comprises forming a helical continuous unitary finished cutting edge.

5. The method of claim 1 wherein said plurality of cutting inserts are arranged in an end-to-end orientation.

6. The method of claim 1 wherein said replacement cutting insert comprises metal carbide.

7. The method of claim 1 wherein said replacement cutting insert comprises tungsten carbide.

8. The method of claim 7 wherein said replacement cutting insert further comprises cobalt.

9. The method of claim 1 wherein said cutter body comprises a flute formed therein, and wherein said connecting said replacement cutting insert comprising connecting said replacement cutting insert within said flute.

10. The method of claim 9 wherein said flute is helical.

11. The method of claim 9 wherein said replacement cutting insert and said remaining ones of said plurality of cutting inserts are arranged in an end-to-end orientation along said flute.

12. The method of claim 9 wherein cutter body comprises a plurality of pockets along said flute, and wherein said connecting said replacement cutting insert comprising connecting said replacement cutting insert within said a pocket of said plurality of pockets.

13. The method of claim 12 wherein said pocket defines cutting insert support surfaces supporting said replacement cutting insert.

14. A method for repairing a cutting tool comprising a cutter body having a working length and a plurality of cutting inserts removably connected to said cutter body, each cutting insert of said plurality of cutting inserts comprising a first end, a second end opposite said first end, and an insert-cutting edge extending from said first end to said second end, wherein at least one cutting insert of said plurality of cutting inserts is a worn or damaged cutting insert, said method comprising:

removing said worn or damaged cutting insert from said cutter body;
connecting a replacement cutting insert to said cutter body at a location where said worn or damaged cutting insert was removed, said replacement cutting insert comprising a first end, a second end opposite said first end, and an insert-cutting edge extending from said first end to said second end, wherein said insert-cutting edge of said replacement cutting insert and said insert-cutting edges of remaining ones of said plurality of cutting inserts form a continuous unitary finished cutting edge extending substantially entirely along said working length of said cutter body; and
precision-grinding said continuous unitary finished cutting edge.

15. The method of claim 14 wherein said connecting said replacement cutting insert is performed without removal from said cutter body of said remaining ones of said plurality of cutting inserts.

16. The method of claim 14 wherein said continuous unitary finished cutting edge is helical.

17. The method of claim 14 wherein said plurality of cutting inserts are arranged in an end-to-end orientation.

18. The method of claim 14 wherein said replacement cutting insert comprises metal carbide.

19. The method of claim 14 wherein said replacement cutting insert comprises tungsten carbide.

20. The method of claim 19 wherein said replacement cutting insert further comprises cobalt.

\* \* \* \* \*